(12) United States Patent
Dreisilker et al.

(10) Patent No.: US 9,022,843 B2
(45) Date of Patent: May 5, 2015

(54) OUTLET VALVE FOR AN AIRPLANE

(75) Inventors: Ralf Dreisilker, Velbert (DE); Rainer Benz, Seligenstadt (DE)

(73) Assignee: Nord-Micro AG & Co. OHG, Frankfurt (DE)

(*) Notice: Subject to any disclaimer, the term of this patent is extended or adjusted under 35 U.S.C. 154(b) by 908 days.

(21) Appl. No.: 12/678,763

(22) PCT Filed: Sep. 25, 2008

(86) PCT No.: PCT/EP2008/062816
§ 371 (c)(1),
(2), (4) Date: Apr. 30, 2010

(87) PCT Pub. No.: WO2009/040389
PCT Pub. Date: Apr. 2, 2009

(65) Prior Publication Data
US 2010/0210201 A1    Aug. 19, 2010

(30) Foreign Application Priority Data

Sep. 25, 2007 (DE) .......................... 10 2007 045 755

(51) Int. Cl.
*B64D 13/04* (2006.01)
*B64D 13/02* (2006.01)

(52) U.S. Cl.
CPC ...................................... *B64D 13/02* (2013.01)

(58) Field of Classification Search
CPC .............................. B01F 5/0413; B64D 13/02
USPC ............. 454/76, 69–74; 244/129.4; 137/602, 137/605–606, 893; 283/238; 251/343
See application file for complete search history.

(56) References Cited

U.S. PATENT DOCUMENTS

| 3,554,216 | A | | 1/1971 | Piguet | |
|---|---|---|---|---|---|
| 4,203,566 | A | * | 5/1980 | Lord | 244/57 |
| 4,400,022 | A | * | 8/1983 | Wright | 285/256 |
| 4,856,756 | A | * | 8/1989 | Combs | 251/297 |
| 5,127,876 | A | * | 7/1992 | Howe et al. | 454/76 |
| 5,148,683 | A | * | 9/1992 | Muller et al. | 62/180 |
| 5,328,152 | A | * | 7/1994 | Castle | 251/229 |
| 5,340,358 | A | * | 8/1994 | Halupczok et al. | 454/299 |

(Continued)

FOREIGN PATENT DOCUMENTS

| DE | 3003664 A1 | 6/1981 |
|---|---|---|
| DE | 19713125 C2 | 8/1998 |

(Continued)

OTHER PUBLICATIONS

Busto, Intenrational Search Report for PCT/EP2008/062816 Dated May 3, 2009, 6 pages.

*Primary Examiner* — Steven B McAllister
*Assistant Examiner* — Ko-Wei Lin
(74) *Attorney, Agent, or Firm* — Brian B. Shaw, Esq.; Thomas B. Ryan; Harter Secrest & Emery LLP

(57) ABSTRACT

An outflow valve (10) for an aircraft has a frame (12) for arrangement in an opening (14) of an outer shell (16) of the aircraft, a first flap (18) pivotably arranged in the frame (12) for controlling a flow cross-section of at least one first inflow opening (24) and at least one outflow opening (15). To achieve a simplified construction of the ventilation system of the aircraft, the outflow valve (10) has a second inflow opening (26) configured to be closable by means of a drivable adjustable member (28).

13 Claims, 2 Drawing Sheets

(56) References Cited

U.S. PATENT DOCUMENTS

| | | | |
|---|---|---|---|
| 5,890,957 A * | 4/1999 | Scherer et al. | 454/76 |
| 6,159,091 A * | 12/2000 | Horstman et al. | 454/76 |
| 6,273,136 B1 * | 8/2001 | Steinert et al. | 137/630 |
| 6,524,180 B1 * | 2/2003 | Simms et al. | 454/65 |
| 6,736,205 B2 * | 5/2004 | Hasenoehrl et al. | 165/202 |
| 6,832,629 B2 * | 12/2004 | Wu | 137/625.21 |
| 6,945,278 B2 * | 9/2005 | Bunn et al. | 137/899.2 |
| 7,093,821 B2 * | 8/2006 | Howe | 251/218 |
| 7,198,062 B2 * | 4/2007 | Hoffman et al. | 137/601.09 |
| 7,494,161 B2 * | 2/2009 | Kanai et al. | 285/403 |
| 7,690,598 B1 * | 4/2010 | Plattner | 244/129.1 |
| 7,709,117 B2 * | 5/2010 | Lee et al. | 429/425 |
| 7,735,877 B2 * | 6/2010 | Ito et al. | 285/239 |
| 7,985,124 B2 * | 7/2011 | Komowski | 454/155 |
| 8,201,775 B2 * | 6/2012 | Treimer et al. | 244/118.5 |
| 2004/0217317 A1 | 11/2004 | Bunn et al. | |
| 2008/0001399 A1 * | 1/2008 | Ito et al. | 285/238 |
| 2008/0231044 A1 * | 9/2008 | Gunderson | 285/93 |
| 2008/0268763 A1 * | 10/2008 | Dippel | 454/152 |
| 2008/0290217 A1 * | 11/2008 | Ghoreishi et al. | 244/129.4 |
| 2011/0212677 A1 * | 9/2011 | Dooley | 454/74 |

FOREIGN PATENT DOCUMENTS

| | | |
|---|---|---|
| GB | 632170 | 11/1949 |
| GB | 1143007 | 2/1969 |
| GB | 1209195 | 10/1970 |
| WO | 2005023649 A1 | 3/2005 |

* cited by examiner

OUTLET VALVE FOR AN AIRPLANE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to an outflow valve for an aircraft comprising a frame to be disposed in an opening of an outer shell of the aircraft, a first flap pivotably arranged within the frame for controlling a flow cross-section, at least one first inflow opening and at least one outflow opening. The invention also relates to a method for controlling such an outflow valve.

2. Description of Related Art

Outflow valves of the initially mentioned type are used in aircraft to vent the cabin and to adjust the cabin pressure. When air uniformly flows into the cabin, a positive pressure relative to the outside of the aircraft is created within the cabin. The outflow valve of the initially mentioned type allows an adjustable amount of air per unit time to escape through its flow cross-section, which is determined by a flap. This is how the pressure in the interior of the aircraft is adjustable by means of the flap.

After landing it may be found that the cabin pressure in an aircraft has a substantial difference with respect to the pressure on the outside of the aircraft. If the cabin pressure is higher than the pressure on the outside, the doors of the aircraft would be suddenly thrown open by the air pressure upon opening. To avoid this risk the outflow valves of an aircraft are generally fully opened prior to opening of the doors to achieve pressure compensation.

The electronics of an aircraft are cooled by an airflow controlled in a similar manner to the cabin air by means of an inflow valve and an outflow valve. The amount of air necessary for cooling the electronics is often substantially larger than the amount of air necessary to ventilate the cabin.

To protect passengers against undesirable drafts, smells and noises in aircrafts, it is provided to substantially separate the airflows for fresh air supply of the cabin and for cooling of the electronics. The airflows for the main cabin, for example, and the aircraft electronics are thus vented via separate outflow valves.

Only in the case where one or more of the valves fail and remain closed ("failed closed"), the airflows are commonly vented via one of the remaining valves. To enable this, the individual valves must be designed to have a relatively large size. In the case of failure, the airflows may then be redirected in a manner unfavorable for passengers.

An outflow valve of the initially mentioned type is described in US 2004/0217317 A1. The outflow valve described there has a cylinder-shaped valve body and a flap defining a flow cross-section within the cylinder-shaped body and capable of closing off the cross-section. To improve the properties of the valve at small opening angles of the flap, walls have been inserted.

DE 197 13 125 C2 describes a method for regulating the cabin pressure in an aircraft and a stepped valve for use with said method. The stepped valve has a large flap to control an outflowing airflow. A smaller flap is inserted in the large flap for fine control of the airflow.

At large pressure differentials the airflow is controlled by means of the position of the small flap. If the pressure differential is small, the airflow is controlled by means of the position of the large flap.

BRIEF SUMMARY OF THE INVENTION

It is the object of the present invention to provide an outflow valve of the initially mentioned type enabling a simplified construction of the ventilation system of an aircraft.

To solve this problem, an outflow valve of the initially mentioned type is suggested, which has a second inflow opening configured to be closable by means of a drivable adjustable member.

The outflow valve according to the present invention has the advantage, in particular, that it can combine two venting paths to a single venting opening in the outer shell of an aircraft. By these means the number of aerodynamically and structurally disadvantageous points on the outer shell of the aircraft is reduced. Furthermore, it is possible to vent airflows in a selective manner via a small number of outflow valves to thus reduce the complexity of the ventilation system. In the most advantageous case it is possible to fully eliminate some of the valves.

Advantageous embodiments are the subject matter of the dependent claims.

Advantageously, the frame has a contacting surface against which the adjustable member can come into contact to close off the second inflow opening. This improves the ease of manufacture.

In an advantageous embodiment, the adjustable member has a cylindrical shape, so that it may be inserted in a simple manner into an outflow valve having a cylindrical basic shape.

Advantageously, the contacting surface can have an annular shape to adapt to the shape of the adjustable member.

The adjustable member and the contacting surface can have a rectangular basic shape in an advantageous embodiment. Advantageously, the outflow opening has an essentially rectangular configuration. This can help to utilize energetic advantages of the outflow, for example during thrust recuperation.

The outflow opening can have an essentially circular or oval-shaped configuration.

The first flap is advantageously pivotable about an axle mounted in the frame. This enables the flap to be precisely oriented on the frame.

The first flap can have a pivotable second flap enabling a portion of the outflow opening to be opened while the first flap is closed. This enables particularly small flow cross-sections to be created in a simple manner.

In a further advantageous embodiment, the frame has a supply duct connected to it in a moveable manner, wherein a flexible attachment element can be provided to connect the frame and the supply duct.

Advantageously, the frame has recesses defining the second outflow opening. The assembly of the outflow valve is simplified by this one-piece configuration.

Advantageously, the frame has a converging constriction element. This constriction element creates a Venturi effect in the manner of a nozzle as it is flowed through creating a negative pressure in the area of the further inflow openings causing the airflows to be sucked off. Additional means for air transport can thus be eliminated.

Advantageously, exhaust air from an electronics area is supplied to the first inflow opening and cabin air is supplied to the second inflow opening.

Furthermore, a method for controlling the outflow valve according to the present invention is suggested, wherein, in a first flight phase, in which the aircraft is grounded and only moves at low speed, the first flap opens. This allows simple and rapid pressure compensation. In a second flight phase, in which the aircraft is airborne, the first flap can be closed, and the flow cross-section can be controlled by the second flap. This has the advantage that the airflow flowing at a particularly high speed due to the high pressure difference between the outside and the inside of the aircraft in flight can be more precisely controlled with a small cross-section.

The adjustable member can open the second inflow opening as required. This can be done both for pressure compensation and to support other outflow valves or to replace their function.

BRIEF DESCRIPTION OF THE SEVERAL VIEW OF THE DRAWINGS

The invention will be explained in more detail with reference to an exemplary embodiment schematically shown in the accompanying drawings, wherein.

DETAILED DESCRIPTION OF THE INVENTION

Figure 1:
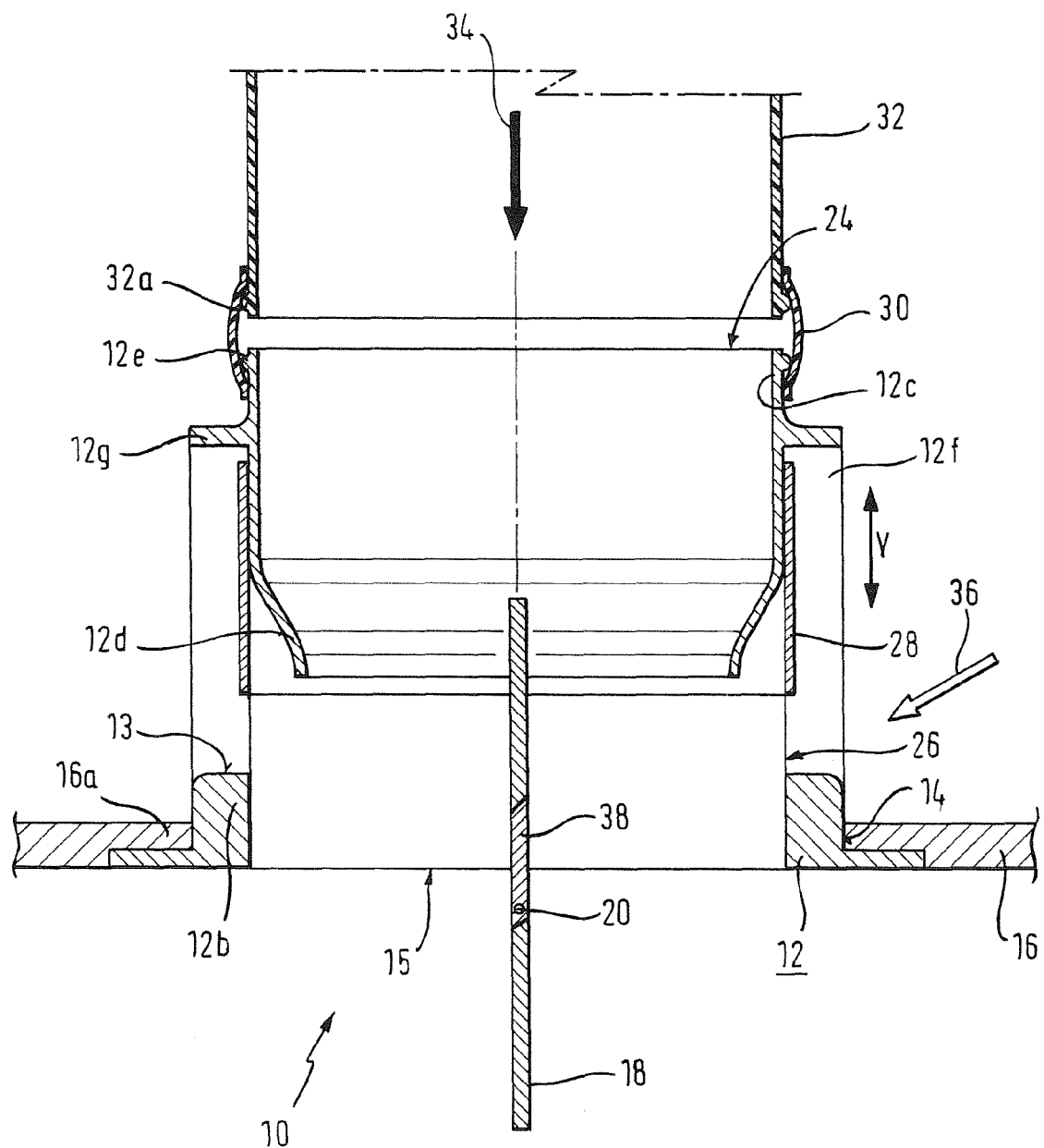
FIG. 1 is a cross-section of an outflow valve according to an embodiment of the present invention during a first flight phase.

The embodiment shown in FIG. 1 of an outflow valve 10 comprises a frame 12 inserted in an opening 14 of an outer shell 16 of an aircraft. To simplify installation, a centering flange 16a is provided in the outer shell 16 at opening 14, in which frame 12 is inserted. Frame 12 has an outflow section 12b defining a circular outflow opening 15.

Outflow opening 15 is closable by means of a first flap 18. First flap 18 is pivotable about a first axle (not shown), mounted on frame 12. Depending on the position of first flap 18, outflow opening 15 is opened to a certain degree.

A second flap 38 is provided in first flap 18, by means of which an essentially rectangular section of outflow opening 15 can be opened, when first flap 18 is closed.

Frame 12 further has an inflow section 12c defining a first inflow opening 24 for the introduction of exhaust air 34 from the electronics of the aircraft. Inflow section 12c has a cylindrical configuration and has a constriction element 12d converging in the flow direction of exhaust air 34.

Inflow section 12c has a circumferential mounting bead 12e at first inflow opening 24 on which an elastic connection element 30 is mounted, connecting inflow section 12c with a supply duct 32. Exhaust air 34 is guided from the aircraft electronics to outflow valve 10 through supply duct 32. Supply duct 32 in turn also has a mounting bead 32a to mount connection element 30.

Frame 12 has recesses 12f between inflow section 12c and outflow section 12b for defining a second inflow opening 26.

Second inflow opening 26 allows cabin air 36 to flow out through outflow valve 10 in addition to exhaust air 34.

Second outflow opening 26 is closable by means of an adjustable member 28 arranged in recesses 12f.

Figure 2:
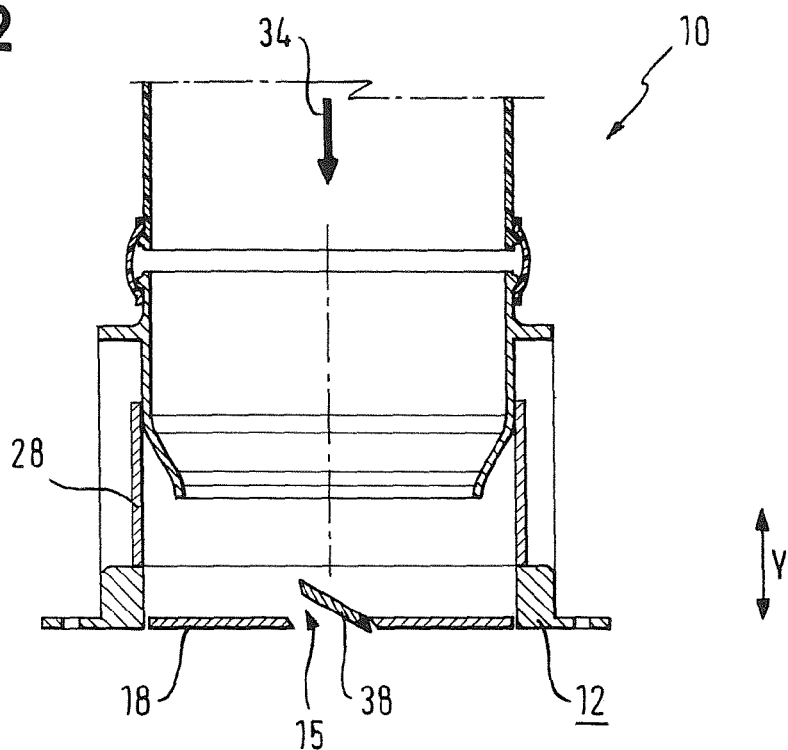
FIG. 2 is a view as in FIG. 1 during a second flight phase.

Adjustable member 28 has a cylindrical configuration and is moveably arranged on the outer circumference of inflow section 12c and constriction element 12d. Adjustable member 28 is adjustable in a direction y by means of a drive (not shown). If adjustable member 28 is adjusted, as shown in FIG. 2, so that it comes into contact against a contacting surface 13 of frame 12, second inflow opening 26 is fully closed.

Frame 12 has a stop 12g at inflow section 12c, which limits the movement of adjustable member 28 and thus defines a maximum opening of second inflow opening 26.

FIG. 1 shows outflow valve 10 for the case in which the aircraft is grounded. Generally, the doors of the aircraft are not opened until the pressure difference between the inside and the outside has fallen to a few mbars. Due to the small pressure difference, the full area of outflow opening 15 is necessary to ensure rapid pressure compensation. To enable good pressure compensation of the aircraft electronics and the cabin with the ambient atmosphere, adjustable member 28 is raised up to stop 12g, and first flap 18 is opened.

Exhaust air 34 flowing out through outflow valve 10 is accelerated in constriction element 12d due to the reduction in cross-section. Due to the Venturi effect, a negative pressure is created at the exit of constriction element 12d, which sucks cabin air 36 through second inflow opening 26. The mixed airflow consisting of exhaust air 34 and cabin air 36 can then flow out of the aircraft through fully opened outflow opening 15.

If, however, as shown in FIG. 2 the aircraft is in a second flight phase, for example, at 43,000 ft, a great pressure difference can be observed between the outside and the inside of the aircraft. In the present exemplary embodiment it is assumed, that a pressure of 770 mbars is present in the cabin and a pressure of 162 mbars is present outside of the aircraft.

In this flight phase, adjustable member 28 is closed and is in contact with frame 12. Cabin air 36 is vented via other valves.

At this pressure difference, reliable and precise control of the outflowing amount of air is no longer ensured exclusively by means of first flap 18. First flap 18 is therefore closed in this case. Instead, the flow cross-section of outflow opening 15 is defined by means of second flap 38, which is pivotable about an axle 20. The amount of outflowing air can thus be controlled by means of second flap 38.

By the combined action of a plurality of outflow valves 10, it is possible to control the airflows in the cabin of an aircraft (flow regulation).

Second flap 38 has a substantially smaller surface area than first flap 18. Due to the smaller closure surface area, smaller forces are necessary to position second flap 38 than are necessary to position first flap 18. The position of second flap 38 can thus be controlled more precisely than that of first flap 18.

Figure 3:
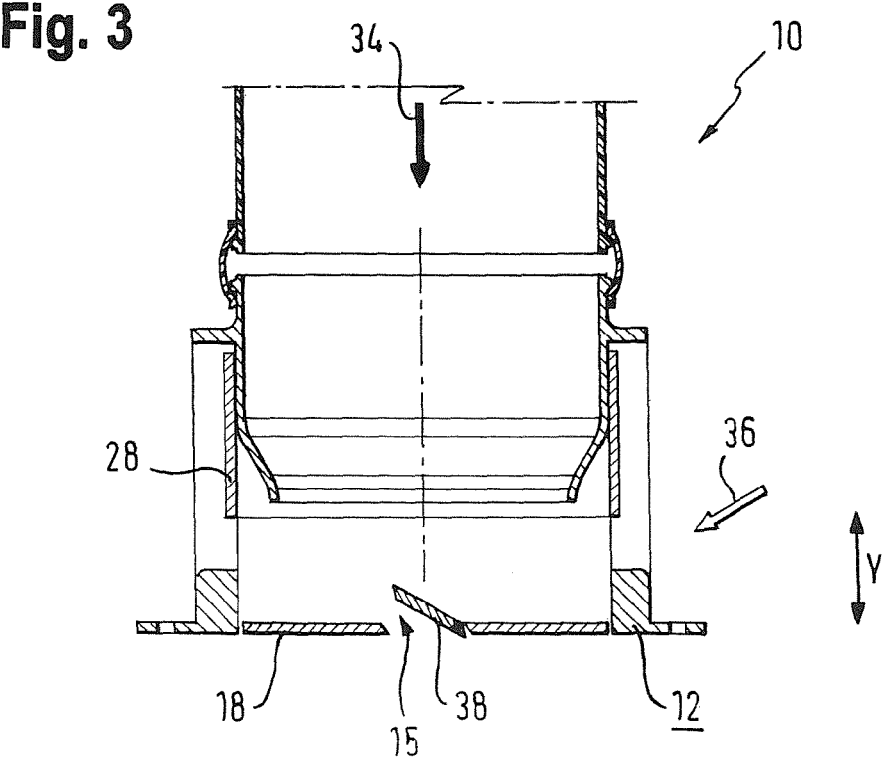
FIG. 3 is a view as in FIG. 2, wherein the adjustable member has opened the second inflow opening.

If there is a malfunction of any of the other valves via which cabin air 36 is vented, it is possible to raise adjustable member 28 and to thus vent cabin air 36 through outflow valve 10 in a controlled manner, as shown in FIG. 3. In this case outflow valve 10 replaces the function of the failed valves.

In a second embodiment, frame 12 has a groove having a form corresponding to adjustable member 28 in such a manner that adjustable member 28 contacts the bottom of the groove in the closed state. This increases the sealing effect in the closed state.

To further improve the sealing effect, a bulge is arranged at the bottom of the groove to reliably seal any spaces between adjustable member 28 and frame 12.

Opening 14 can also have a polygonal or round shape. The precise shape of opening 14 can thus be adapted to each installation position and according to aerodynamic criteria, such as thrust recuperation.

It is also possible to connect adjustable member 28 and first flap 18 by means of a positive actuation mechanism, so that a position change of adjustable member 28 causes rotation of first flap 18.

Outflow valve 10 according to the present invention combines a plurality of exhaust air paths in an aircraft and thus enables simple venting of the cabin even in case of individual valves failing, simple pressure regulation in the second flight phase, and rapid and efficient pressure compensation in the first flight phase.

The invention claimed is:

1. An outflow valve for a ventilation system arranged for use in an outer shell of an aircraft, comprising a first inflow opening for exhaust air from an electronics area, and a second inflow opening for cabin exhaust air, a common outflow opening for exhausting through the outer shell of the aircraft both the exhaust air from the electronics area entering the outflow valve through the first inflow opening and the cabin exhaust air entering the outflow valve through the second inflow opening, the first inflow opening being defined by an inflow section comprising a constriction element converging in the flow direction of exhaust air, and an exit of the constriction element being located adjacent the second inflow opening for creating a negative pressure near the second inflow opening for drawing the cabin exhaust air through the second inflow opening and exhausting the cabin exhaust air together with the exhaust air from the electronics area through the common outflow opening, and further comprising a frame for arrangement in an opening of an outer shell of the aircraft, a first flap pivotably arranged in the frame for controlling a flow cross-section through the common outflow opening, the second inflow opening being formed by recesses provided in the frame, the second inflow opening being closable by an adjustable member that surrounds the inflow section of the first inflow opening and is displaceable with respect to the frame along the inlet section beyond the exit of the constriction element of the inflow section in the flow direction of exhaust air for closing the second inflow opening.

2. The outflow valve according to claim 1, wherein the frame has a contacting surface against which the adjustable member can come into contact to close off the second inflow opening.

3. The outflow valve according to claim 1, wherein the contacting surface has an annular configuration.

4. The outflow valve according to claim 1, wherein the contacting surface has a rectangular basic configuration.

5. The outflow valve according to claim 1, wherein the common outflow opening has an essentially rectangular configuration.

6. The outflow valve according to claim 1, wherein the common outflow opening has an essentially circular or oval-shaped configuration.

7. The outflow valve according to claim 1, wherein the first flap is pivotable about an axle mounted in the frame.

8. The outflow valve according to claim 7, wherein the first flap has a second flap pivotable about an axle, enabling a portion of the common outflow opening to be opened while the first flap is closed.

9. The outflow valve according to claim 1, wherein the frame is connected with a supply duct in a moveable manner.

10. The outflow valve according to claim 9, wherein the frame is connected with the supply duct by means of a flexible connection element.

11. The outflow valve according to claim 1, wherein exhaust air from an electronics area is supplied to the first inflow opening and cabin air is supplied to the second inflow opening.

12. A method for controlling an outflow valve according to claim 1, comprising steps of opening the first flap of the outflow valve in a first flight phase, in which the aircraft is grounded and only moves at low speed, and closing the first flap and adjusting a second flap of the outflow valve to control the flow cross section in a second flight phase, in which the aircraft is airborne.

13. The method according to claim 12, including a step of adjusting the adjustable member of the outflow valve to open the second inflow opening for pressure compensation as required during both the first flight phase, in which the aircraft is grounded and only moves at low speed, and the second flight phase, in which the aircraft is airborne.

* * * * *